United States Patent
Sivalingham et al.

(10) Patent No.: US 7,586,922 B2
(45) Date of Patent: Sep. 8, 2009

(54) PROVIDING HIGHER LAYER PACKET/FRAME BOUNDARY INFORMATION IN GRE FRAMES

(75) Inventors: Sanjeevan Sivalingham, San Diego, CA (US); Martin Renschler, San Diego, CA (US); Erik Colban, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 727 days.

(21) Appl. No.: 11/044,946

(22) Filed: Jan. 27, 2005

(65) Prior Publication Data

US 2005/0201343 A1 Sep. 15, 2005

Related U.S. Application Data

(60) Provisional application No. 60/552,872, filed on Mar. 12, 2004.

(51) Int. Cl.
- H04L 12/28 (2006.01)
- H04J 3/16 (2006.01)
- H04B 7/212 (2006.01)
- H04W 4/00 (2006.01)

(52) U.S. Cl. .................. 370/395.52; 370/338; 370/349; 370/401; 370/466; 709/223

(58) Field of Classification Search ......... 370/220–321, 370/331–395, 401–466; 709/223–227, 249–250; 455/436–442
See application file for complete search history.

(56) References Cited

U.S. PATENT DOCUMENTS

| | | | | |
|---|---|---|---|---|
| 6,304,574 B1 * | 10/2001 | Schoo et al. | ............... | 370/401 |
| 6,779,051 B1 * | 8/2004 | Basil et al. | ............... | 710/33 |
| 6,963,582 B1 * | 11/2005 | Xu | ............... | 370/466 |
| 7,185,107 B1 * | 2/2007 | Cassar | ............... | 709/239 |
| 7,330,448 B2 * | 2/2008 | Verma et al. | ............... | 370/331 |
| 7,349,359 B2 * | 3/2008 | Chang et al. | ............... | 370/312 |
| 2002/0196743 A1 * | 12/2002 | Thalanany et al. | ............... | 370/252 |
| 2003/0002467 A1 * | 1/2003 | Leung | ............... | 370/338 |
| 2004/0047366 A1 * | 3/2004 | Chowdhury | ............... | 370/466 |
| 2004/0085951 A1 * | 5/2004 | Rezaiifar et al. | ............... | 370/352 |
| 2004/0258028 A1 * | 12/2004 | Hossain et al. | ............... | 370/335 |
| 2005/0220069 A1 * | 10/2005 | Li et al. | ............... | 370/349 |

(Continued)

OTHER PUBLICATIONS

W. Simpson: "IP in IP Tunneling" IETF, 'Online! Oct. 1995; XP002338122.

(Continued)

Primary Examiner—M. Phan
(74) Attorney, Agent, or Firm—Coats & Bennett, P.L.L.C.

(57) ABSTRACT

A Packet Data Services Node (PDSN) optionally frames user data from an Application IP packet received from a public data network (e.g., the Internet) into a Point-to-Point Protocol (PPP) frame, and encapsulates the Application IP packet or PPP frame data into one or more Generic Routing Encapsulation (GRE) frames for further transmission within a wireless communication network. The PDSN additionally inserts into each GRE frame, Application IP packet fragmentation information that indicates whether the Application IP packet or PPP frame terminates in the associated GRE frame. Other network nodes, such as a Packet Control Facility (PCF) or Base Station Controller (BSC), may interpret the fragmentation information and ascertain the boundaries of Application IP packets or PPP frames, using this information to improve network efficiency.

39 Claims, 4 Drawing Sheets

U.S. PATENT DOCUMENTS

2006/0045128 A1* 3/2006 Madour .................. 370/466
2006/0050696 A1* 3/2006 Shah et al. ............... 370/389
2006/0056381 A1* 3/2006 Kim ....................... 370/349
2006/0200543 A1* 9/2006 Kong et al. ............... 709/223
2006/0245408 A1* 11/2006 Lee et al. ................. 370/338

OTHER PUBLICATIONS

"Interoperability Specification (IOS) for cdma 2000 Access Network Interfaces—Part 2 Transport" 3GPP2, 'Online! Jul. 2003; XP002338121.

* cited by examiner

PROVIDING HIGHER LAYER PACKET/FRAME BOUNDARY INFORMATION IN GRE FRAMES

RELATED APPLICATIONS

This application claims priority to Provisional U.S. Patent Application 60/552,872 filed Mar. 12, 2004, which is incorporated herein by reference.

BACKGROUND

The present invention relates generally to the field of wireless communication networks and in particular to a method of communicating the boundaries of data packets to network nodes.

The 3rd Generation (3G) wireless communication networks provide mobile users wireless access to packet data networks, such as the Internet. Many Internet applications and services, once available only to users at fixed terminals, are now being made available via wireless communication networks to mobile users. Services such as real-time streaming video and music, on-line interactive gaming, text messaging, email, web browsing and Voice over IP (VoIP), or Push-to-Talk ("walkie talkie" functionality) are just a few examples of services now being provided via wireless networks to mobile users.

These services are characterized by packet-switched data transfer, in which data is encapsulated into a logical unit called a packet, which contains a source and destination address and is routed from source to destination along nodes in one or more networks. Many data packets may be transmitted together on shared wireless traffic channels, with each mobile station retrieving only data packets addressed to it. This mode of data transfer is distinguished from the traditional circuit-switched paradigm of early-generation wireless voice communications, wherein a wireless traffic channel was dedicated to each individual call, or voice conversation. Packet-switched data transfer is generally more flexible and allows for more efficient utilization of network resources, than circuit-switched data transfer.

According to some modern wireless communication network standards, a Packet Data Service Node (PDSN) within the network interfaces to external packet-switched data networks, such as the Internet, and effects packet data communication between these external networks and the Radio Access Network (RAN) of the wireless system. Within the RAN, a Base Station Controller (BSC) eventually receives packet data forwarded by the PDSN, and directs it to individual mobile stations in radio contact with one or more Radio Base Stations. Packets additionally are communicated in the reverse direction, from a mobile station to an external network node.

On the wireless network side of the PDSN, a Point-to-Point Protocol (PPP) is established between the PDSN and the mobile station. This protocol, and any protocol layer above, is transparent to the RAN. That is, within the wireless network, there is no explicit concept of Application IP (or upper IP layer) packets and packet boundaries, only a continuous octet stream. To facilitate routing control and Quality of Service (QoS) requirements within the wireless network, the PDSN encapsulates the octet stream into one or more Generic Routing Encapsulation (GRE) frames. These GRE frames are the upper layer protocol for link or network layer communications among nodes within the wireless network, which may themselves be IP links (lower IP layer). In many cases, the PDSN may package one Application IP packet per GRE frame, and so the BSC may implicitly infer Application IP packet boundaries.

In other cases, however, Application IP packets may be split, or fragmented, into several GRE frames. When the Application IP packet is split into two or more GRE frames (known as GRE fragmentation), the BSC (and intervening network nodes) has no direct way of inferring where the Application IP packet boundaries are. The BSC may peek into the octet stream to detect the PPP packet boundaries and IP packet boundaries of packets carried with the PPP packets, but that requires processing of every octet within the octet stream. GRE fragmentation may be used to avoid IP segmentation, which occurs if the IP packet encapsulating the GRE frame exceeds the Maximum Transmit Unit (MTU) of any of the links within the RAN (i.e., between the PDSN and the BSC or intervening nodes). IP segmentation means that large IP packets are segmented into smaller packets, each fitting within the MTU. IP segmentation requires reassembly of the segmented IP packet before the encapsulated GRE packet and its encapsulated Application IP packet may be restored at the receiving entity. Depending on the configuration of the RAN and the architecture of the nodes of the RAN, segmentation and reassembly may be done on several hops.

In many cases, network efficiency is improved if the BSC or other network nodes can obtain the Application IP packet boundary information. For example, if a buffer overflow or other unrecoverable error occurs in transmitting data from the BSC to a mobile station, the BSC should discard all data in the corresponding Application IP packet. Transmitting the remaining data in the packet would merely waste air resources, since the mobile station would not be able to reassemble the packet. Knowledge of Application IP packet boundaries is required in certain applications such as broadcasting data, where framing is performed at the BSC, or in applications where Application IP packets are sent out-of-order over the air interface, such as when transmitting high priority packets first to achieve QoS requirements. However, the GRE header does not include any provision for identifying whether the GRE frame carries an entire Application IP packet, or whether the Application IP packet is fragmented among two or more GRE frames.

SUMMARY

Upon encapsulating user data in an Application IP packet (or PPP frame) into GRE frames for transmission throughout the wireless network, fragmentation information indicative of which GRE frame terminates the Application IP packet or PPP frame is inserted into the GRE frame. When the GRE frames are received at a destination node (or intervening node), Application IP packet or PPP frame boundaries may be ascertained by interpreting the fragmentation information. This information may be used to increase network efficiency.

In one embodiment, the present invention relates to a method of indicating the boundary of an Application Internet Protocol (IP) packet containing user data, in a wireless communication network comprising a Packet Data Services Node (PDSN), a Packet Control Function (PCF) and a Base Station Controller (BSC). The Application IP packet is received at the PDSN. User data from the Application IP packet is encapsulated into one or more Generic Routing Encapsulation (GRE) frames. Fragmentation information indicating whether the Application IP packet terminates in the GRE frame is included in each GRE frame.

In another embodiment, the present invention relates to a method of communicating user data and associated logical boundary information from a source node to a destination node in a wireless network. User data having a logical boundary are buffered at the source node. The user data are encapsulated into two or more data structures. Fragmentation information indicative of the logical boundary is including in at least one data structure. The two or more lower network layer data structures are then transmitted to the destination node.

In another embodiment, the present invention relates to a method of ascertaining a logical boundary associated with user data at a wireless network receiving node. At least one Generic Routing Encapsulation (GRE) frame containing user data is received from a wireless network transmitting node. The at least one GRE frame is decapsulated to extract the user data and fragmentation information. The fragmentation information interpreted to ascertain the logical boundary. The logical boundary information is then used to control the further transmission of the user data.

DETAILED DESCRIPTION

Figure 1:
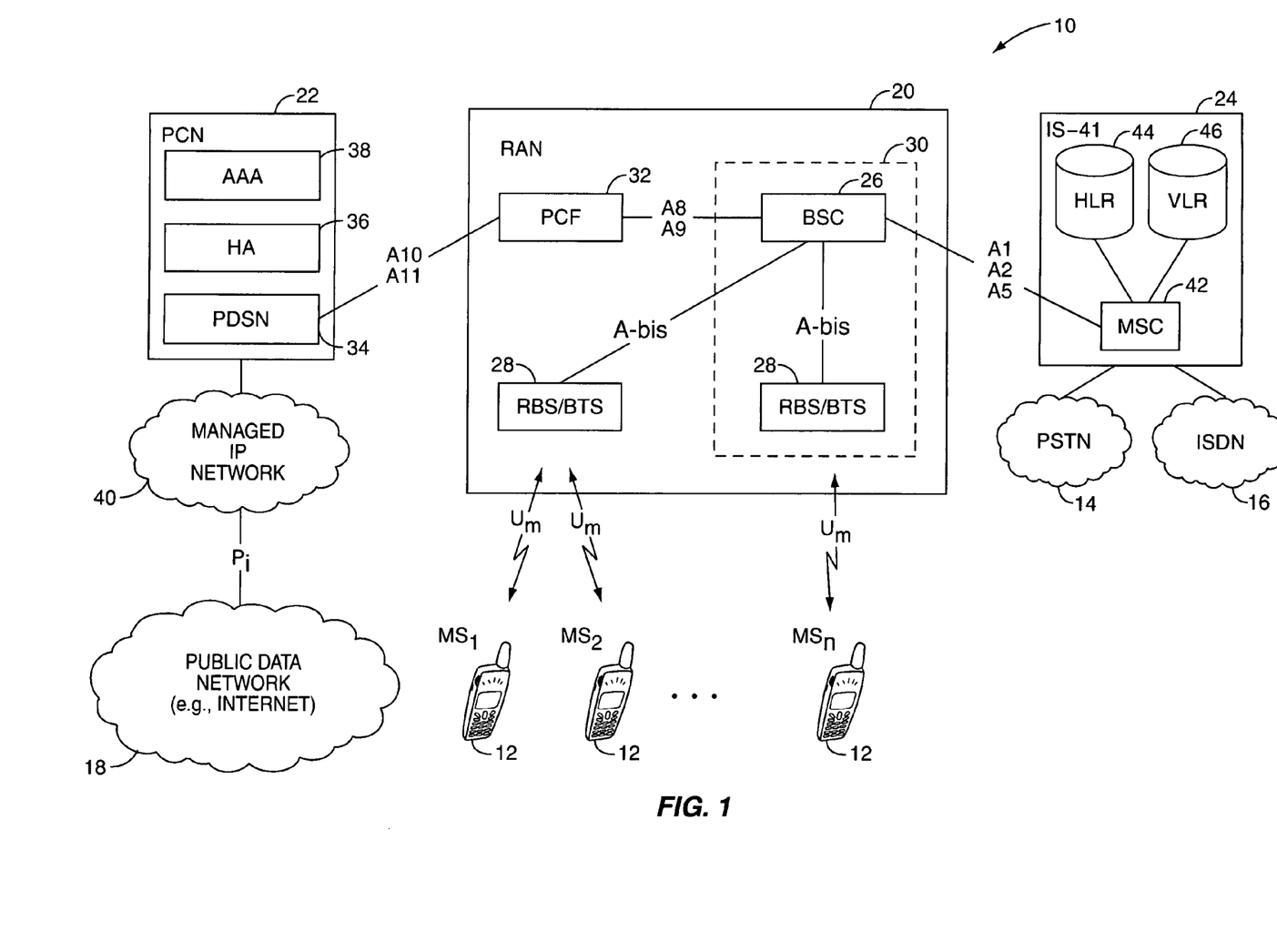
FIG. 1 is a functional block diagram of a wireless communication network.

FIG. 1 illustrates an exemplary wireless communication network generally referred to by the numeral 10. The wireless communication network 10 may be any type of wireless communication network, such as a CDMA network, WCDMA network, GSM/GPRS network, EDGE network, or UMTS network. In one exemplary embodiment, network 10 is based on cdma2000, 1xEV-DV standards as promulgated by the Telecommunications Industry Association (TIA), although the present invention is not limited to such implementations. Here, network 10 communicatively couples one or more mobile stations 12 to another mobile station 12, or to the Public Switched Telephone Network (PSTN) 14, the Integrated Data Services Network (ISDN) 16, and/or a Public Data Network (PDN) 18, such as the Internet. In support of this functionality, the network 10 comprises a Radio Access Network (RAN) 20 connected to a Packet Core Network (PCN) 22 and an IS-41 network 24.

The RAN 20 typically comprises one or more Base Station Controllers (BSCS) 26, each connected to one or more Radio Base Stations (RBS) 28 via an A-bis interface. Each RBS 28 (also known in the art as a Base Transceiver Station, or BTS) includes the transceiver resources (not shown) supporting radio communication with mobile stations 12, such as modulators/demodulators, baseband processors, radio frequency (RF) power amplifiers, antennas, etc. The combination of a BSC 26 and a RBS 28 form a Base Station (BS) 30. Note that a given BSC 26 may be part of more than one BS 30. In operation, a BS 32 transmits control and traffic data to mobile stations 12 on forward link channels, and receives control and traffic data from the mobile stations 12 on reverse link channels.

The BSC 26 is communicatively coupled to the PCN 22 via a Packet Control Facility (PCF) 32. The BSC 26 connects to the PCF 32 over an A8 interface carrying user traffic and an A9 interface carrying signaling. The PCF 32 manages the buffering and relay of data packets between the BS 30 and the PCN 22. As those of skill in the art will recognize, the PCF 32 may be part of the BSC 26, or may comprise a separate network entity.

The PCN 22 comprises a Packet Data Serving Node (PDSN) 34, a Home Agent (HA) 36, and an Authentication, Authorization, and Accounting (AAA) server 38. Typically, the PCN 22 couples to the PDN 18 through a managed IP network 40, which operates under the control of the network 10. The IP network 40 connects to the PDN 18 via a $P_i$ interface, or alternatively another industry standard packet data communication protocol, such as Transport Control Program/Internet Protocol (TCP/IP). Alternatively, the PCN 22 may couple directly to the PDN 18, such as the Internet.

The PDSN 34 provides packet routing services, maintaining routing tables and performing route discovery. The PSDN 34 additionally manages the Radio-Packet (R-P) interface and Point-to-Point Protocol (PPP) sessions for mobile users, assigning authenticated mobile stations 12 an IP address from a pool of addresses. The PSDN 34 also provides Foreign Agent (FA) functionality for registration and service of network visitors, and initiates authentication procedures with the AAA server 38. The PSDN is communicatively coupled to the PCF 32 via an A10 interface for user traffic and an A11 interface for signaling. HA 36 operates in conjunction with PDSN 34 to authenticate Mobile IP registrations and to maintain current location information in support of packet tunneling and other traffic redirection activities. The AAA server 38 provides authentication, authorization and accounting services for the PSDN 34.

The BSC 26 also communicatively couples the RAN 20 to the IS-41 network 24. The IS-41 network 24 includes a Mobile Switching Center (MSC) 42 accessing a Home Location Register (HLR) 44 and Visitor Location Register (VLR) 46 for subscriber location and profile information. The MSC 42, coupled to the BSC 26 via an A1 interface for signaling and A2/A5 interface for user traffic, switches circuit-mode traffic between mobile stations 12 and the PSTN 16 and ISDN 14, and provides processing and control for calls and services.

Figure 2:
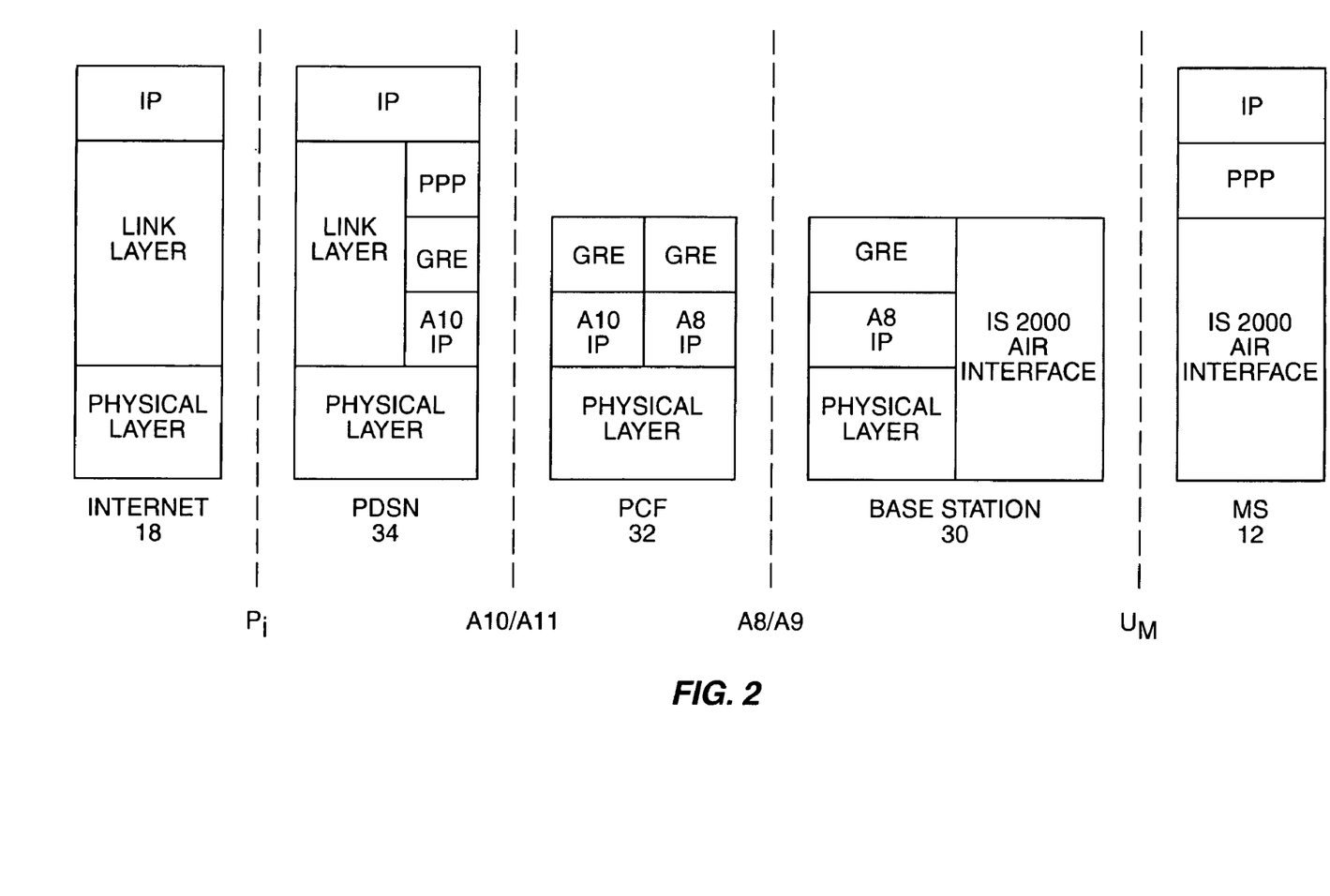
FIG. 2 is a network protocol stack diagram for a wireless communication network.

FIG. 2 is a diagram depicting one protocol stack for packet data communications from an external network such as the Internet 18 to mobile stations 12. Application IP packets are received by the PDSN 34 over a standard network interface, such as TCP/IP. A framing function in the PPP layer at the PDSN 34 normally frames the Application IP packets into PPP frames, to support PPP connections between the PDSN 34 and mobile stations 12. However, in some applications, such as Broadcast/Multicast Services (BCMCS) Application IP packets are not assembled in PPP frames, but rather the data are provided directly to the BSC 26 for synchronization, framing and delivery to the mobile stations 12.

Regardless of whether or not the PDSN 34 assembles Application IP packets into PPP frames, it encapsulates incoming packet data into Generic Routing Encapsulation (GRE) frames. The GRE frames are then encapsulated in A10 IP frames, and transmitted to the PCF 32 over the A10 interface. The PCF 32 extracts data within the GRE frames of the A10 IP packets, and assembles them into GRE frames within A8 IP packets, transmitting these to the BSC 26. Note that GRE frames used over A8 are not necessarily the same GRE frames used over A10. For example, the GRE keys could be different.

The BSC 26 receives the A8 IP packets, and extracts the GRE frames. The base station 26 then extracts the octet stream from the GRE frames. The BSC 26, together with a RBS 28 (forming a base station 30), then transmits the data to one or more mobile stations 12 over the $U_m$ interface. Each mobile station 12 subsequently receives PPP framed Application data. In certain cases of BCMCS, PPP is not used, and the BS 30 encapsulates the Application data IP packets into Broadcast Framing Protocol frames and transmits them to the mobile station. In these cases, the mobile station 12 receives Broadcast Framing Protocol frames Application data. Those of skill in the art will recognize that the protocol stack depicted in FIG. 2 is representative only, and may be different for different applications.

Due to the encapsulation of Application IP packets or PPP frames into GRE frames at the PDSN 34, and the transmission of data in GRE frames throughout the wireless network 10, no concept of the Application IP packet or PPP frame boundaries is maintained within the wireless network 10. That is, Application packet data is reliably communicated to mobile stations 12, but information regarding the Application IP packet itself, such as the packet boundaries, is not maintained. This information is lost as the PDSN 34 assembles Application IP packet data into GRE frames. The assembly of Application IP packet data into GRE frames is depicted in FIG. 3.

Data extracted from the Application IP packet is assembled into a PPP frame (as discussed above, this step may be omitted in the case of BCMCS). The data is then encapsulated in GRE frames. Each GRE frame includes a GRE header and GRE payload. The GRE payload, which carries the user data, is divided into octets. In a preferred embodiment, the GRE payload includes an extended header that may include information such as a time stamp or sequence number, flow control attributes, or other information not defined as part of the GRE header. The presence of the header extension may be indicated by the Protocol Type field in the GRE header or in A11 Registration Request/Reply messages when setting up the A10 connection. While the present discussion is in the context of GRE framing at the PDSN 34, note that a similar GRE framing process occurs at the PCF 32, as data extracted from GRE frames of the A10 IP packets is assembled into GRE frames within A8 IP packets.

In general, an Application IP packet may be as large as the maximum packet size allowed by the IP protocol. Consequently, an Application IP packet or PPP frame may exceed the maximum transmission unit (MTU) of the link layer connection between the PDSN 34 and PCF 32, or between the PCF 32 and the BSC 26. For example, the MTU of an Ethernet connection is 1500 octets. Even if the Application IP packet is the size of the MTU or smaller, the PDSN 34 adds headers for the PPP and GRE framing and A8/A10 tunneling, and thus the resulting A8/A10 IP packet may exceed the relevant MTU. Thus, the Application IP packets or PPP frames must be fragmented. The fragmentation may occur at the GRE framing (GRE fragmentation) or at the A8/A10 IP encapsulation (A8/A10 IP fragmentation).

Figure 3:
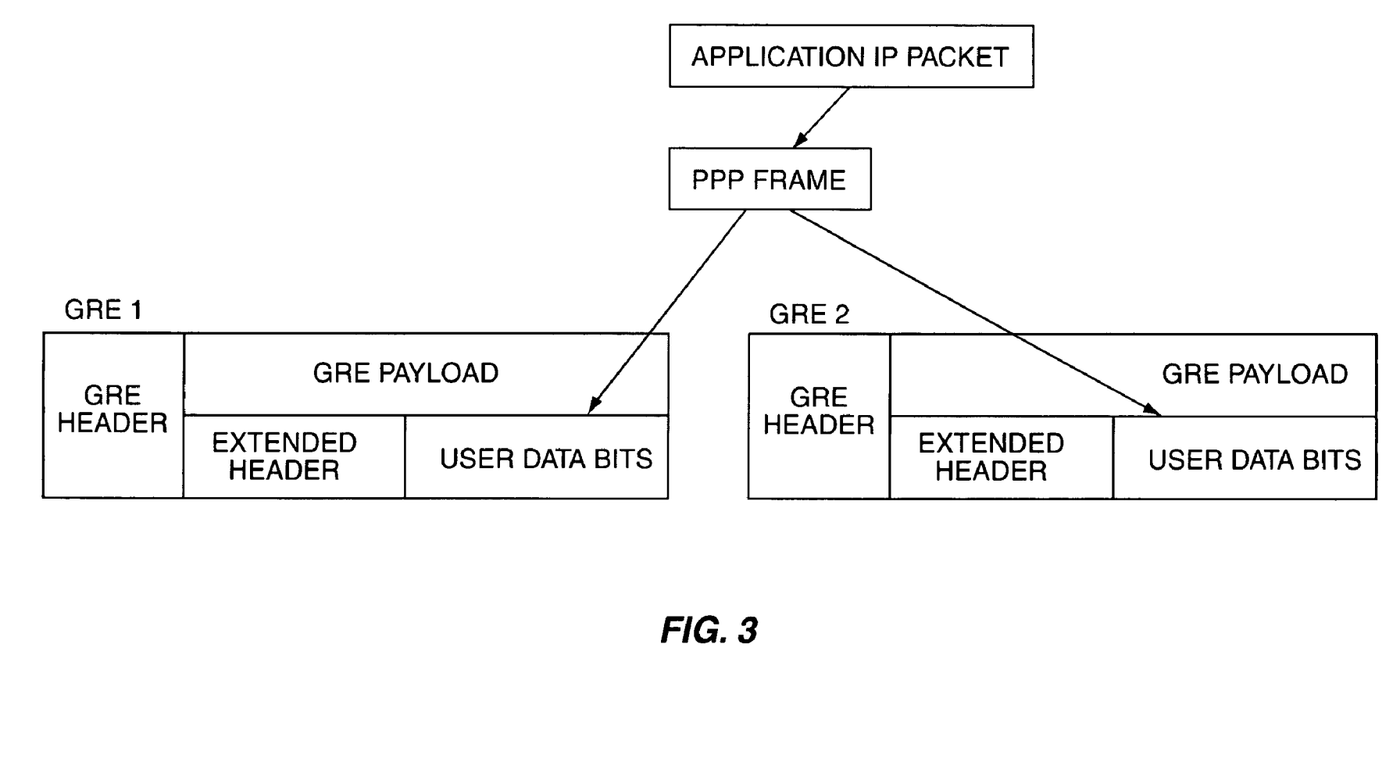
FIG. 3 is a block diagram depicting GRE fragmentation.

FIG. 3 depicts GRE fragmentation at the PDSN 34, where the Application IP packet or PPP frame is fragmented prior to encapsulation into GRE frames. Each GRE frame is subsequently encapsulated into A10 IP packets by the PDSN 34. A similar process occurs at the PCF 32, where data extracted from GRE frames in the A10 IP packets are encapsulated into GRE frames in A8 IP packets. In the case of GRE fragmentation, the PCF 32 and ultimately the BSC 26 has no way to ascertain the original boundaries of the Application IP packet or PPP frame, as the data arrive in separate, independent GRE frames. Alternatively, the PDSN 34 (and/or PCF 32) may encapsulate the Application IP packet or PPP frame into a single, large GRE frame, and divide the GRE frame among numerous A8/A10 IP packets, using A8/A10 IP fragmentation.

Because the relevant wireless communication standards do not mandate either GRE fragmentation or A8/A10 IP fragmentation, the PCF 32 and BSC 26 have no way to ascertain Application IP packet or PPP frame boundaries. If A8/A10 IP fragmentation is utilized, the GRE frames will be reassembled by the A8/A10 layers, and each GRE frame contains a complete Application IP packet or PPP frame. However, the PDSN 34 and/or PCF 32 may have implemented GRE fragmentation, in which case an Application IP packet or PPP frame may be spread over multiple received GRE frames.

There are several reasons that the PCF 32 and/or the BSC 26 may advantageously utilize Application IP packet or PPP frame boundary information. For example, the PCF 32 or BSC 26 may buffer user data prior to delivery to the BSC 26 or a mobile station 12, respectively (or, particularly in the case of the BSC 26, following transmission of the data but prior to conformation that it was accurately received). Under some conditions, such as an imminent buffer overflow, the PCF 32 or BSC 26 may choose to discard some data in its buffers. If the discarded data comprises part of a fragmented Application IP packet or PPP frame, then the PCF 32 or BSC 26 should additionally discard all other data fragmented from the same Application IP packet or PPP frame. Otherwise, network resources will be wasted in transmitting the non-discarded data through the network and/or over the air interface to a mobile station 12, which will ultimately be unable to reassemble the Application IP packet or PPP frame due to the discarded data.

As another example, the BSC 26 may prioritize the delivery of buffered Application IP packets or PPP frames by scheduling higher priority data for transmission over the air interface ahead of lower priority packets, to satisfy QoS requirements. Such prioritization results in out-of-order transmission by the BSC 26. To ensure that such reordering does not disrupt PPP framing, the BSC 26 may advantageously utilize PPP frame boundary information to ensure that the transmission of a lower priority PPP frame starts only after the completion of transmission of a higher priority PPP frame.

As still another example, in Broadcast/Multicast Services (BCMCS), the synchronization and framing of Application IP packets occurs in the BSC 26 rather than in the PDSN 34. In order for the BSC 26 to frame complete Application IP packets, the BSC 26 needs to be aware of Application IP packet boundaries.

According to the present invention, upon performing GRE encapsulation, the PDSN 34 inserts Application IP packet fragmentation information into the at least one GRE frame that indicates the Application IP packet or PPP frame boundary. This is depicted, in one embodiment, in FIG. 4. The fragmentation information is preferably included in the GRE header; however, the header is well defined and unlikely to be amended by the standards-issuing bodies to allocate space for the fragmentation information. Accordingly, the Application IP packet boundary fragmentation information may be defined and inserted into the extended GRE header. In general, the fragmentation information may be placed at any position within the GRE frame that is defined for it—i.e., in the header, an extended header or in the user data portion of the payload.

Figure 4:
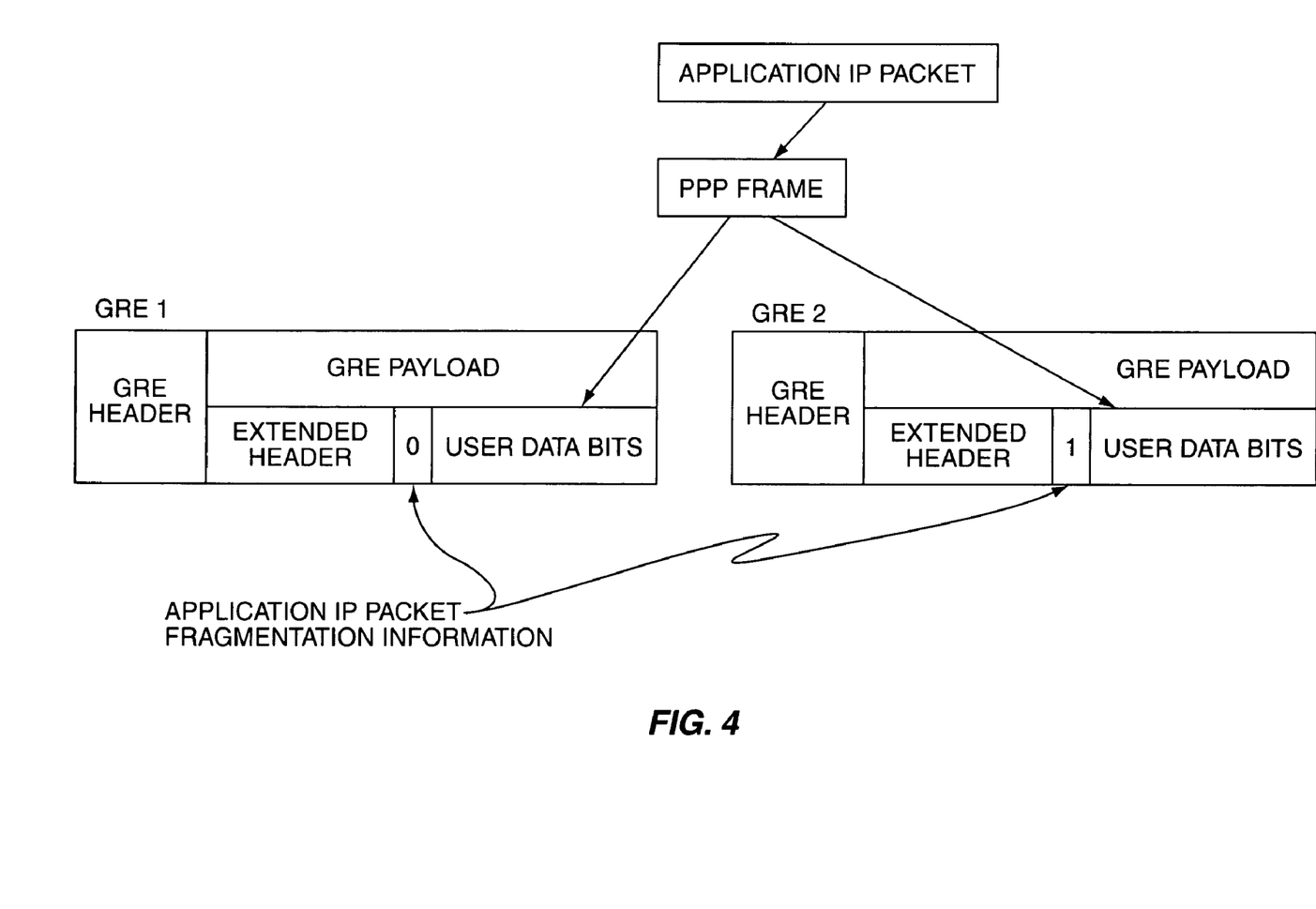
FIG. 4 is a block diagram depicting GRE fragmentation and including Application IP packet fragmentation information.

In some cases, Application IP packets may arrive in fragmented condition at the PDSN 34. According to one embodiment of the present invention, the PDSN 34 recognizes this, such as for example by inspection of the offset and continuation bits in the IP header. In this case, the PDSN 34 may "assemble" the Application IP packet and optionally perform PPP framing prior to GRE fragmentation and insertion of fragmentation information into the GRE frame(s). Alternatively, the PDSN 34 may dynamically encapsulate the Application IP fragments into GRE frames as they arrive, inserting fragmentation information into one or more GRE frames and immediately encapsulating the GRE frames in A10 packets for transmission onto the wireless network (e.g., to the PCF 32). In this manner, the benefits of ascertaining Application IP packet or PPP frame boundary information discussed above accrue to large Application IP packets that arrive fragmented at the PDSN 34 (for example, deleting all of the Application IP packet or PPP frame if a portion of the packet or frame is dropped).

In one embodiment, as depicted in FIG. 4, the Application IP packet fragmentation information comprises a single bit. The bit may, for example, assume a value of 0 for any fragmented GRE frame that does not terminate an Application IP packet or PPP frame. The fragmentation information bit may assume a value of 1 when the associated GRE frame includes the end of an Application IP packet or PPP frame. Thus, a GRE frame containing a complete Application IP packet or PPP frame would carry a fragmentation information bit with a value of 1. Only the initial and intermediate fragmented GRE frames would contain a fragmentation information bit with a value of 0. In this case, the PCF 32 or BSC 26 may simply accumulate received GRE frames until it encounters one with the Application IP packet fragmentation information bit set, marking the end of the Application IP packet or PPP frame. One drawback of single-bit fragmentation information is that if the packet containing the set fragmentation information bit is lost, the subsequent Application IP packet or PPP frame will also be lost, as it will erroneously be concatenated to the received fragments of the prior Application IP packet or PPP frame.

In another embodiment, the Application IP packet fragmentation information comprises two bits, and the fragmentation state of the GRE frame is indicated by the encoding of the two bits. As one non-limiting example, the bits may have the values depicted in Table 1 below. This ensures that the only one Application IP packet or PPP frame is lost if any fragment thereof is lost. Those of skill in the art will recognize that other encodings of the fragmentation information bits are possible.

TABLE 1

First Representative Encoding of Fragmentation Information Bits

| MSB | LSB | comment |
|---|---|---|
| 0 | 0 | non-fragmented (complete) packet/frame |
| 0 | 1 | start of fragmented packet/frame |
| 1 | 0 | intermediate portion of fragmented packet/frame |
| 1 | 1 | end of fragmented packet/frame |

In another embodiment, the Application IP packet fragmentation information bits may be encoded to have individual significance, for example with the MSB indicating the beginning of an Application IP packet or PPP frame, and the LSB indicating the end. In this encoding scheme, the bit values would indicate GRE fragmentation as indicated in Table 2 below.

TABLE 2

Second Representative Encoding of Fragmentation Information Bits

| MSB | LSB | comment |
|---|---|---|
| 0 | 0 | intermediate portion of fragmented packet/frame |
| 0 | 1 | end of fragmented packet/frame |
| 1 | 0 | start of fragmented packet/frame |

TABLE 2-continued

Second Representative Encoding of Fragmentation Information Bits

| MSB | LSB | comment |
|---|---|---|
| 1 | 1 | non-fragmented (complete) packet/frame; including a start and end |

In still another embodiment, the Application IP packet fragmentation information may comprise an n-bit sequence number. In one embodiment, the transmitting node may number the N fragments starting with N, and decrementing the fragmentation information sequence number for each successive fragment, with the last one numbered one. When the receiving node encounters the Application IP packet boundary fragmentation information sequence number with a value of one, it knows that all fragments have been received (and missing fragments can be specifically identified by checking the continuity of sequence numbers).

By defining and including Application IP packet fragmentation information in GRE frames, nodes within the wireless network 10, such as the PCF 32 and BSC 26, can readily determine the boundaries of Application IP packets or PPP frames, and utilize this information where appropriate to improve network efficiency. The Application IP packet fragmentation information of the present invention will convey this information regardless of whether the Application IP packet or PPP frame was GRE fragmented or A8/A10 IP fragmented at the PDSN 34 or PCF 32.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of indicating the boundary of an Application Internet Protocol (IP) packet containing user data, in a wireless communication network including a Packet Data Services Node (PDSN), comprising:
    receiving said Application IP packet at said PDSN;
    encapsulating user data from said Application IP packet into one or more Generic Routing Encapsulation (GRE) frames; and
    including in at least one said GRE frame, fragmentation information indicating the boundary of said Application IP packet.

2. The method of claim 1 further comprising framing said Application IP packet into a Point-to-Point Protocol (PPP) frame, prior to encapsulating into said GRE frames.

3. The method of claim 1 wherein receiving said Application IP packet at said PDSN comprises receiving two or more fragmented IP packets and assembling said fragmented IP packets at said PDSN to recover said Application IP packet prior to said GRE encapsulation.

4. The method of claim 3 wherein assembling said fragmented IP packets at said PDSN to recover said Application IP packet comprises inspecting offset and continuation bits in said fragmented IP packet headers to determine the number and order of said fragmented IP packets in said Application IP packet.

5. The method of claim 1 further comprising:
encapsulating said GRE frames into one or more A10 IP packets; and
transmitting said A10 IP packets to a Packet Control Facility (PCF) in said network.

6. The method of claim 5 further comprising:
decapsulating said GRE frames from said A10 IP packets at said PCF;
decapsulating said user data from said GRE frames at said PCF; and
interpreting said fragmentation information to ascertain said Application IP packet boundary.

7. The method of claim 6 further comprising:
encapsulating said user data and said fragmentation information into one or more GRE frames in one or more A8 IP packets; and
transmitting said A8 IP packets to a Base Station Controller (BSC) in said network.

8. The method of claim 7 further comprising:
decapsulating said GRE frames from said A8 IP packets at said BSC;
decapsulating said user data from said GRE frames at said BSC; and
interpreting said fragmentation information to ascertain said Application IP packet boundary.

9. The method of claim 1 wherein said fragmentation information comprises a single bit.

10. The method of claim 1 wherein said fragmentation information comprises two bits, the encoding of said bits indicating one of: data from a non-fragmented Application IP packet in the GRE frame, data the start of a fragmented Application IP packet in the GRE frame, data from an intermediate portion of a fragmented Application IP packet in the GRE frame, or data from the end of a fragmented Application IP packet in the GRE frame.

11. The method of claim 10 wherein a first bit of said fragmentation information indicates the GRE frame includes data from the start of an Application IP packet and a second bit of said fragmentation information indicates the GRE frame includes data from the end of an Application IP packet.

12. The method of claim 1 wherein said fragmentation information comprises a sequence number uniquely identifying each GRE frame containing a fragmented Application IP packet.

13. The method of claim 12 wherein said the sequence number for the GRE frame including data from the start of said Application IP packet is the total number of GRE frames containing data from said fragmented Application IP packet, and wherein said sequence number decrements for each successive GRE frame, to a value of "1" for the GRE frame including data from the end of said fragmented Application IP packet.

14. A method of communicating user data and associated logical boundary information from a source node to a destination node in a wireless network, comprising:
buffering user data having a logical boundary at said source node;
encapsulating said user data into two or more data structures;
including in at least one said data structure, fragmentation information indicative of said logical boundary; and
transmitting said two or more lower network layer data structures to said destination node.

15. The method of claim 14 wherein said source node is a Packet Data Services Node (PDSN), said data having a logical boundary comprises an Application IP packet.

16. The method of claim 15 further comprising encapsulating said Application IP packet into a Point-to-Point Protocol (PPP) frame prior to said encapsulation into two or more data structures.

17. The method of claim 15 wherein said PDSN encapsulates said user data into Generic Routing Encapsulation (GRE) frames and includes in at least one said GRE frame, fragmentation information indicating whether said Application IP packet terminates in said GRE frame.

18. The method of claim 14 wherein said fragmentation information comprises a single bit indicating the end of said logical boundary in the associated GRE frame.

19. The method of claim 14 wherein said fragmentation information comprises two bits, and wherein interpreting said fragmentation information to detect said logical boundary comprises interpreting the encoding of said bits as one of: non-fragmented user data in the GRE frame, the beginning of fragmented user data in the GRE frame, an intermediate portion of fragmented user data in the GRE frame, the end of fragmented user data in the GRE frame.

20. The method of claim 19 wherein interpreting said fragmentation information to detect said logical boundary comprises interpreting a first bit of said fragmentation information to indicate the GRE frame includes the start of fragmented user data and interpreting a second bit of said fragmentation information to indicate the GRE frame includes the end of fragmented user data.

21. The method of claim 14 wherein said fragmentation information comprises a sequence number uniquely identifying each GRE frame containing fragmented user data.

22. The method of claim 21 wherein said the sequence number for the GRE frame including the start of said fragmented user data is the total number of GRE frames containing fragmented user data, and wherein said sequence number decrements for each successive GRE frame, to a value of "1" for the GRE frame including the end of said fragmented user data.

23. The method of claim 14 further comprising, at said destination node, uncapsulating said data from said data structures and interpreting said fragmentation information to detect said logical boundary.

24. The method of claim 23 wherein said destination node comprises a Packet Control Facility (PCF).

25. The method of claim 23 wherein said destination node is a Base Station Controller (BSC).

26. A method of ascertaining a logical boundary associated with user data at a wireless network receiving node, comprising:
receiving, from a wireless network transmitting node, at least one Generic Routing Encapsulation (GRE) frame containing said user data;
decapsulating said at least one GRE frame to extract said user data and fragmentation information;
interpreting said fragmentation information to ascertain said logical boundary; and
using said logical boundary information to control the further transmission of said user data.

27. The method of claim 26 wherein said destination node comprises a Packet Control Facility (PCF).

28. The method of claim 26 wherein said destination node is a Base Station Controller (BSC).

29. The method of claim 26 wherein said logical boundary denotes an Application IP packet.

30. The method of claim 29 wherein using the logical boundary information to control the further transmission of said user data comprises discarding all said user data in said Application IP packet if any portion of said user data is lost.

31. The method of claim 29 wherein using the logical boundary information to control the further transmission of said user data comprises synchronizing and framing a plurality of said Application IP packets in delivering Broadcast/Multicast Services.

32. The method of claim 26 wherein said logical boundary denotes a Point-to-Point Protocol (PPP) frame.

33. The method of claim 32 wherein using the logical boundary information to control the further transmission of said user data comprises transmitting PPP frames in priority order.

34. The method of claim 26 wherein said fragmentation information is inserted into said at least one GRE frame at said wireless network transmitting node.

35. The method of claim 26 wherein said fragmentation information comprises a single bit indicating the end of said logical boundary in the associated GRE frame.

36. The method of claim 26 wherein said fragmentation information comprises two bits, and wherein interpreting said fragmentation information to detect said logical boundary comprises interpreting the encoding of said bits as one of: non-fragmented user data in the GRE frame, the beginning of fragmented user data in the GRE frame, an intermediate portion of fragmented user data in the GRE frame, the end of fragmented user data in the GRE frame.

37. The method of claim 36 wherein interpreting said fragmentation information to detect said logical boundary comprises interpreting a first bit of said fragmentation information to indicate the GRE frame includes the start of fragmented user data and interpreting a second bit of said fragmentation information to indicate the GRE frame includes the end of fragmented user data.

38. The method of claim 26 wherein said fragmentation information comprises a sequence number uniquely identifying each GRE frame containing fragmented user data.

39. The method of claim 38 wherein said the sequence number for the GRE frame including the start of said fragmented user data is the total number of GRE frames containing fragmented user data, and wherein said sequence number decrements for each successive GRE frame, to a value of "1" for the GRE frame including the end of said fragmented user data.

* * * * *

UNITED STATES PATENT AND TRADEMARK OFFICE
CERTIFICATE OF CORRECTION

PATENT NO. : 7,586,922 B2
APPLICATION NO. : 11/044946
DATED : September 8, 2009
INVENTOR(S) : Sivalingham et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1150 days.

Signed and Sealed this

Twenty-first Day of September, 2010

David J. Kappos
*Director of the United States Patent and Trademark Office*